United States Patent
Hayashi (10) Patent No.: US 11,778,718 B2
(45) Date of Patent: Oct. 3, 2023

(54) HIGH VOLTAGE GENERATOR AND X-RAY GENERATOR

(71) Applicant: MEIDENSHA CORPORATION, Tokyo (JP)

(72) Inventor: Takumi Hayashi, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/927,087

(22) PCT Filed: May 12, 2021

(86) PCT No.: PCT/JP2021/018014
§ 371 (c)(1),
(2) Date: Nov. 22, 2022

(87) PCT Pub. No.: WO2021/241227
PCT Pub. Date: Dec. 2, 2021

(65) Prior Publication Data
US 2023/0199934 A1    Jun. 22, 2023

(30) Foreign Application Priority Data
May 27, 2020 (JP) .................. 2020-091964

(51) Int. Cl.
*H05G 1/10* (2006.01)
*H01J 35/02* (2006.01)
(Continued)

(52) U.S. Cl.
CPC ............. *H05G 1/10* (2013.01); *H01J 35/025* (2013.01); *H05G 1/12* (2013.01); *H05G 1/14* (2013.01); *H05G 1/32* (2013.01)

(58) Field of Classification Search
CPC .... H05G 1/10; H05G 1/12; H05G 1/14; H05J 35/025
See application file for complete search history.

(56) References Cited

U.S. PATENT DOCUMENTS

| | | | | |
|---|---|---|---|---|
| 4,164,665 A | * | 8/1979 | Berger | ............... G11C 11/50 439/43 |
| 2007/0272433 A1 | * | 11/2007 | Gorrell | .................. H05K 1/183 174/250 |

(Continued)

FOREIGN PATENT DOCUMENTS

| EP | 0 691 801 A1 | 1/1996 |
|---|---|---|
| JP | 57-089390 U | 6/1982 |

(Continued)

*Primary Examiner* — Chih-Cheng Kao
(74) *Attorney, Agent, or Firm* — Foley & Lardner LLP (57) ABSTRACT

A high voltage generator including a Cockcroft-Walton circuit structured to receive alternating-current power supplied from an alternating-current power source and apply a potential difference to a load includes: three or more circuit boards arranged at intervals in a thickness direction thereof; capacitors, each of which is shaped flat and mounted to a corresponding one of the circuit boards; and diodes, each of which is connected to corresponding ones of the circuit boards. Out of the three or more circuit boards, each circuit board other than two circuit boards disposed at both ends of the arrangement of the three or more circuit boards includes indentations. Each of the diodes is disposed in a corresponding one of the indentations.

7 Claims, 11 Drawing Sheets

(51) Int. Cl.
　　　*H05G 1/32*　　　(2006.01)
　　　*H05G 1/14*　　　(2006.01)
　　　*H05G 1/12*　　　(2006.01)

(56) References Cited

U.S. PATENT DOCUMENTS

| | | |
|---|---|---|
| 2009/0041192 A1 | 2/2009 | Sundaram et al. |
| 2013/0156160 A1* | 6/2013 | Vadivel .................... H05G 1/10 378/104 |
| 2014/0270083 A1* | 9/2014 | Dinsmore ................ H05G 1/02 378/101 |
| 2016/0156280 A1 | 6/2016 | Morita et al. |
| 2016/0308434 A1 | 10/2016 | Warmack et al. |

FOREIGN PATENT DOCUMENTS

| | | |
|---|---|---|
| JP | 08-022896 A | 1/1996 |
| JP | 2002-324697 A | 11/2002 |
| JP | 2008-053076 A | 3/2008 |
| JP | 2010-244834 A | 10/2010 |
| JP | 2016-512915 A | 5/2016 |
| JP | 6097393 B2 | 3/2017 |
| WO | WO-2015/005380 A1 | 1/2015 |

* cited by examiner

HIGH VOLTAGE GENERATOR AND X-RAY GENERATOR

TECHNICAL FIELD

The present invention relates to downsizing of a high voltage generator.

BACKGROUND ART

Figure 11:
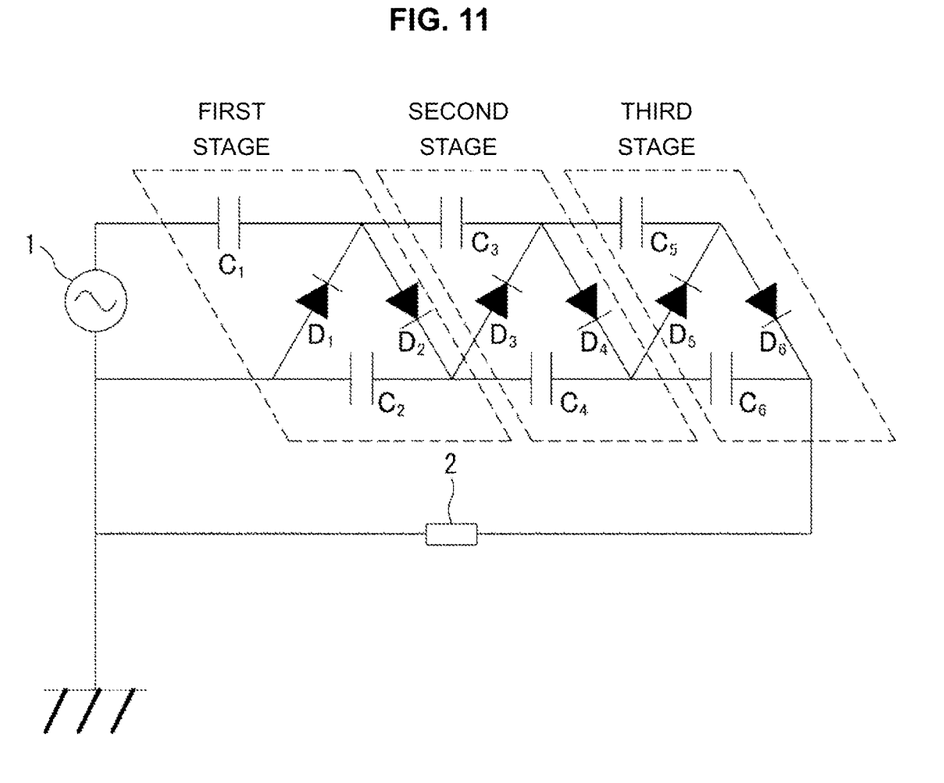
FIG. 11 is a diagram showing an example of a Cockcroft-Walton circuit.

A high voltage generator employed in an X-ray generator for medical application often includes a Cockcroft-Walton circuit (hereinafter referred to as a CW circuit). FIG. 11 shows a circuit diagram of a CW circuit.

Patent Document 1 discloses a method for downsizing a CW circuit. FIG. 3 of Patent Document 1 shows that each of diodes 3a-1, 3a-2, and 3a-3 employs bent lead wires, and each of capacitors 2a-1, 2a-2, 2a-3, and 2a-4 is a cylindrical molded one.

However, this causes a voltage applied per stage of the CW circuit to be received by one capacitor in the stage alone, and accordingly requires the capacitors to be large-sized ones high in withstand voltage sufficiently to bear voltage allotments in the CW circuit. Otherwise it is allowed to arrange capacitors low in withstand voltage in series. However, this increases the CW circuit in size in a stage-increasing direction (i.e., a horizontal direction in FIG. 3 of Patent Document 1), and impedes downsizing of the CW circuit. Furthermore, end electrodes of the capacitors are required to be large to a certain extent, and refuse excessive downsizing.

In view of the foregoing, it is desirable to provide a high voltage generator smaller in size and higher in productivity.

PRIOR ART DOCUMENT(S)

Patent Document(s)

Patent Document 1: JP 6097393 B2

SUMMARY OF THE INVENTION

According to one aspect of the present invention in view of the foregoing problem, a high voltage generator including a Cockcroft-Walton circuit structured to receive alternating-current power supplied from an alternating-current power source and apply a potential difference to a load, the high voltage generator includes: three or more circuit boards arranged at intervals in a thickness direction thereof; capacitors each of which is shaped flat and mounted to a corresponding one of the circuit boards; and diodes each of which is connected to corresponding ones of the circuit boards, wherein: out of the three or more circuit boards, each circuit board other than two circuit boards disposed at both ends of the arrangement of the three or more circuit boards includes indentations; and each of the diodes is disposed in a corresponding one of the indentations.

According to another aspect, each of the diodes includes an lead wire extending straight.

According to still another aspect, each of the diodes includes an lead wire bent twice, and connected to a corresponding one of the circuit boards at an end face of the corresponding one of the circuit boards.

According to still another aspect, the capacitors include a pair of the capacitors respectively mounted to a front face and a back face of a corresponding one of the circuit boards, and connected to each other in parallel.

According to still another aspect, each of the circuit boards is divided by a slit.

According to still another aspect, the circuit boards are fixed with a jig for positioning of the circuit boards, upon assembly of the circuit boards.

According to still another aspect, the high voltage generator is employed in an X-ray generator.

The above aspects of the present invention serve to provide a high voltage generator downsized and improved in productivity.

MODE(S) FOR CARRYING OUT THE INVENTION

The following details first to fourth embodiments of a high voltage generator according to the present invention, with reference to FIGS. 1 to 11.

First Embodiment

High voltage generators are used for, for example, X-ray generators. A high voltage generator often includes a CW circuit. First, the following describes a CW circuit with reference to FIG. 11. The CW circuit is structured to receive alternating-current power supplied from an alternating-current power source 1, and apply a high potential difference to a load 2.

As shown in FIG. 11, alternating-current power source 1 includes a first end to which capacitors $C_1$, $C_3$, and $C_5$ are connected in series. Furthermore, alternating-current power source 1 includes a second end to which capacitors $C_2$, $C_4$, and $C_6$ are connected in series. The second end of alternating-current power source 1 is grounded.

A diode $D_1$ is disposed to connect a common node between alternating-current power source 1 and capacitor $C_2$ to a common node between capacitor $C_1$ and capacitor $C_3$. A diode $D_2$ is disposed to connect the common node between capacitor $C_1$ and capacitor $C_3$ to a common node between capacitor $C_2$ and capacitor $C_4$. A diode $D_3$ is disposed to connect the common node between capacitor $C_2$ and capacitor $C_4$ to a common node between capacitor $C_3$ and capacitor $C_5$. A diode $D_4$ is disposed to connect the common node between capacitor $C_3$ and capacitor $C_5$ to a common node between capacitor $C_4$ and capacitor $C_6$. A diode $D_5$ is disposed to connect the common node between capacitor $C_4$ and capacitor $C_6$ to capacitor $C_5$. A diode $D_6$ is disposed to connect a common node between capacitor $C_5$ and diode $D_5$ to capacitor $C_6$.

Load 2 is disposed to connect a common node between capacitor $C_6$ and diode $D_6$ to the second end of alternating-current power source 1.

The CW circuit in FIG. 11 is a three-stage type one. In case of two-stage type, the third stage in the circuit of FIG. 11 is removed. In case of four-stage or more type, the CW circuit additionally includes a circuit composed of capacitors and diodes similarly to the first to third stages in FIG. 11, as a fourth stage and later.

Figure 1:
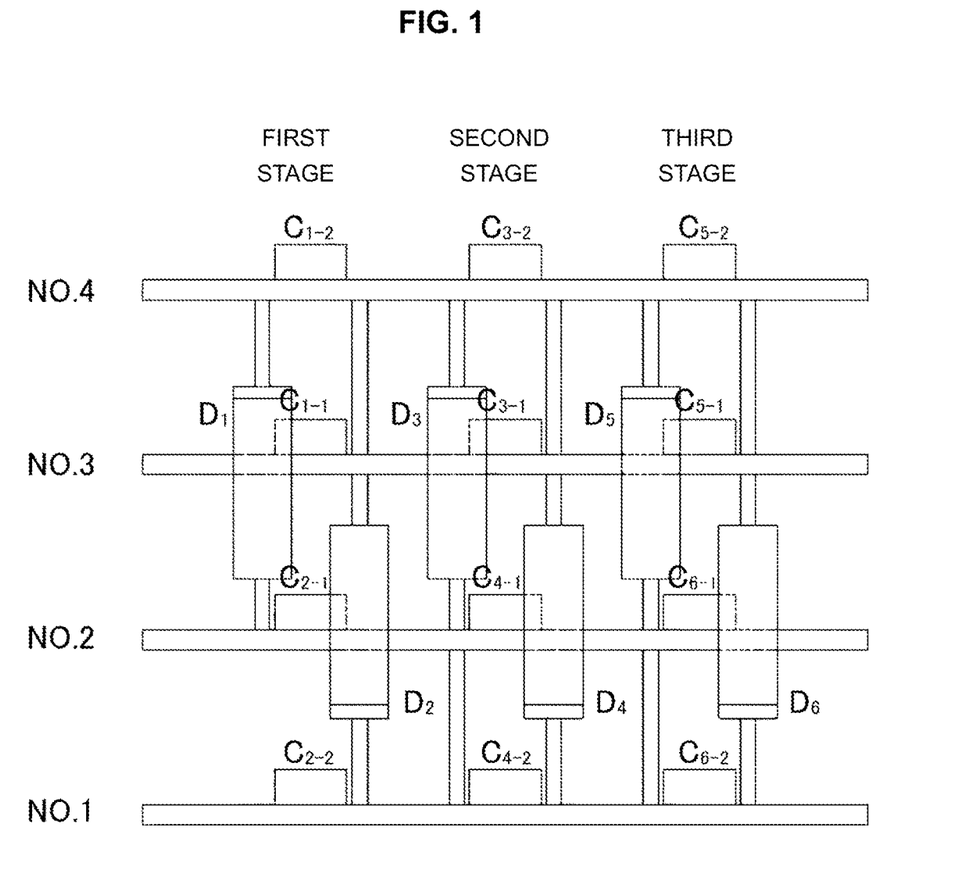
FIG. 1 is a front view of a high voltage generator according to a first embodiment.
Figure 2:
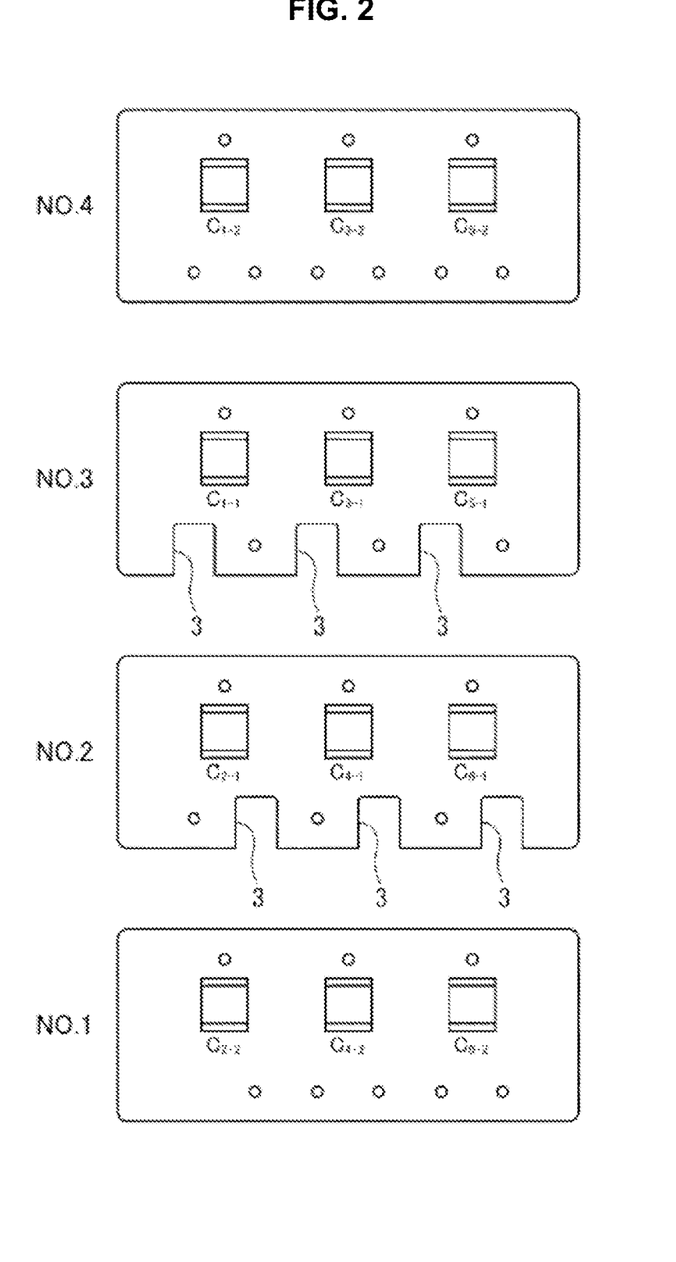
FIG. 2 is a top view of circuit boards of the high voltage generator according to the first embodiment.

FIGS. 1 and 2 show a structure of a high voltage generator according to the first embodiment. FIG. 1 is a front view of the high voltage generator. FIG. 2 is a top view of circuit boards of the high voltage generator.

The high voltage generator is required to include at least three circuit boards, and includes four circuit boards No. 1 to No. 4 in the first embodiment. Circuit boards No. 1 to No. 4 are arranged at intervals in a thickness direction thereof, and are connected to each other via diodes and connection terminals. In addition, circuit boards No. 1 to No. 4 employ capacitors having flat shapes and being mountable to surfaces of the circuit boards.

As shown in FIG. 1, circuit board No. 1 has capacitors $C_{2-2}$, $C_{4-2}$, and $C_{6-2}$. Circuit board No. 2 has capacitors $C_{2-1}$, $C_{4-1}$, and $C_{6-1}$. Circuit board No. 3 has capacitors $C_{1-1}$, $C_{3-1}$, and $C_{6-1}$. Circuit board No. 4 has capacitors $C_{1-2}$, $C_{3-2}$, and $C_{5-2}$. Furthermore, capacitors in the same stage are aligned with each other in a direction perpendicular to an axis of stage-increasing.

Diode $D_1$ includes a first end (i.e., an anode) connected to circuit board No. 2 and a second end (i.e., a cathode) connected to circuit board No. 4. Diode $D_2$ includes a first end (i.e., an anode) connected to circuit board No. 4 and a second end (i.e., a cathode) connected to circuit board No. 1. The first end (the anode) of diode $D_2$ is provided with a lead wire extending through a through hole of circuit board No. 3 and being connected also to circuit board No. 3 by soldering at the through hole of circuit board No. 3. Diode $D_3$ includes a first end (i.e., an anode) connected to circuit board No. 1 and a second end (i.e., a cathode) connected to circuit board No. 4. The first end (the anode) of diode $D_3$ is provided with a lead wire extending through a through hole of circuit board No. 2 and being connected also to circuit board No. 2 by soldering at the through hole of circuit board No. 2. Diode $D_4$ includes a first end (i.e., an anode) connected to circuit board No. 4 and a second end (i.e., a cathode) connected to circuit board No. 1. The first end (the anode) of diode $D_4$ is provided with a lead wire extending through a through hole of circuit board No. 3 and being connected also to circuit board No. 3 by soldering at the through hole of circuit board No. 3. Diode $D_5$ includes a first end (i.e., an anode) connected to circuit board No. 1 and a second end (i.e., a cathode) connected to circuit board No. 4. The first end (the anode) of diode $D_5$ is provided with a lead wire extending through a through hole of circuit board No. 2 and being connected also to circuit board No. 2 by soldering at the through hole of circuit board No. 2. Diode $D_6$ includes a first end (i.e., an anode) connected to circuit board No. 4 and a second end (i.e., a cathode) connected to circuit board No. 1. The first end (the anode) of diode $D_6$ is provided with a lead wire extending through a through hole of circuit board No. 3 and being connected also to circuit board No. 3 by soldering at the through hole of circuit board No. 3.

As shown in FIG. 1, the lead wires of diodes $D_1$ to $D_6$ are not bent but extend straight.

The reference numerals $D_1$ to $D_6$ of the diodes apply to FIG. 1 and FIG. 11. Capacitor $C_{1-1}$ and capacitor $C_{1-2}$ in FIG. 1 are connected in series to form a series circuit corresponding to capacitor $C_1$ in FIG. 11, wherein connection wiring between capacitor $C_{1-1}$ and capacitor $C_{1-2}$ are partially omitted in FIG. 1. The same applies to the other capacitors $C_2$ to $C_6$.

Alternating-current power source 1 shown in FIG. 11 generates a voltage applied between circuit board No. 2 and circuit board No. 3.

Figure 3:
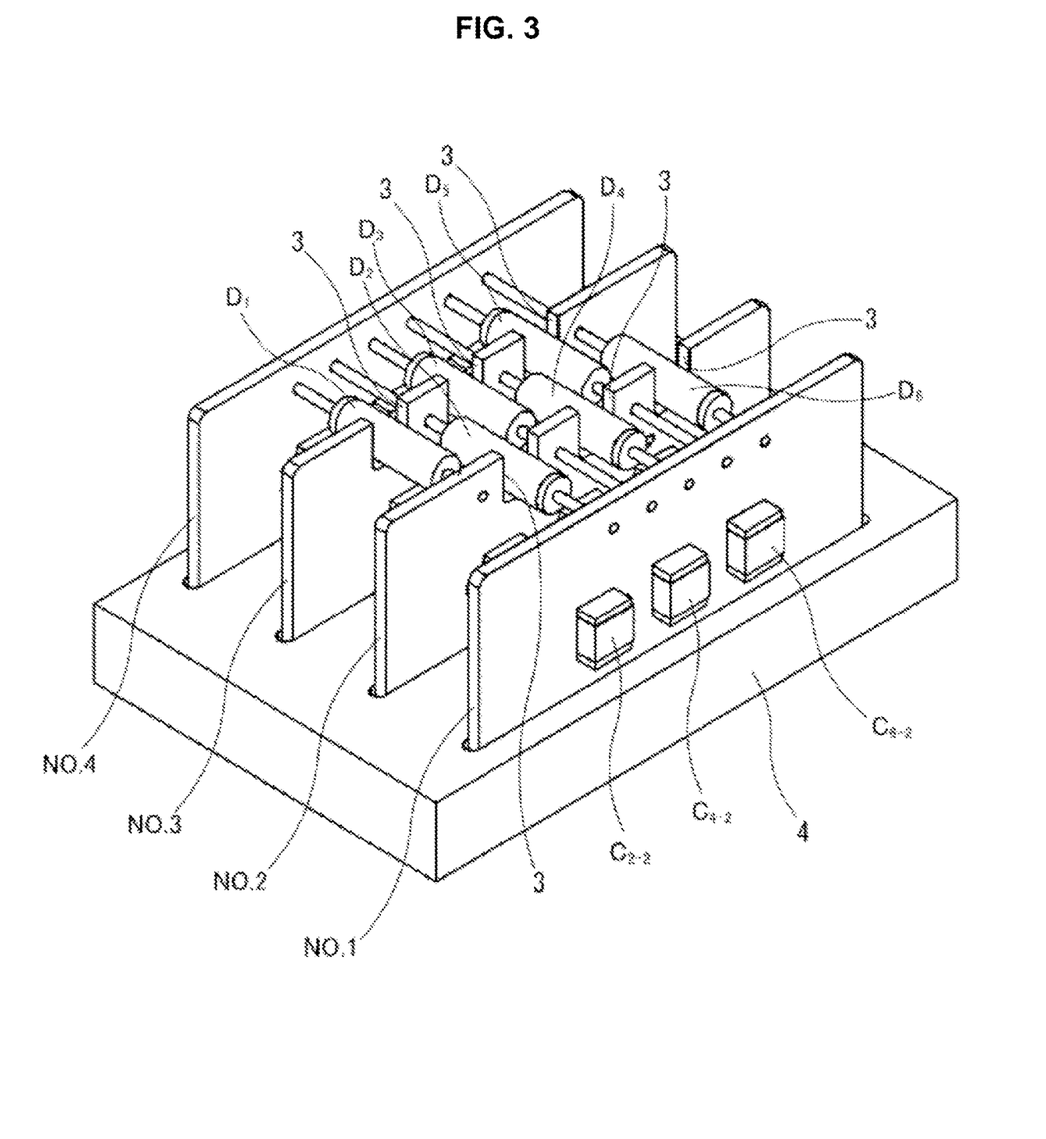
FIG. 3 is a perspective view of the high voltage generator according to the first embodiment.

FIG. 3 is a perspective view of the high voltage generator according to the first embodiment. Each of circuit boards No. 2 and No. 3 being middle part circuit boards, i.e., circuit boards other than two circuit boards disposed at both ends of the arrangement of the three or more circuit boards includes indentations 3. Indentations 3 receive diodes $D_1$ to $D_6$.

FIG. 3 shows also a jig 4 for positioning of the circuit boards which facilitates assembly operation of the circuit boards. Jig 4 may be detached from the circuit boards after completion of the assembly operation, or may be mounted to a device together with the circuit boards.

Patent Document 1 employs capacitors having relatively large exterior shapes, and has difficulty in downsizing of a device. Furthermore, Patent Document 1 employs the bent lead wires for the diodes, and may undergo dielectric breakdown in case of change in distance to surrounding components due to deformation of the diode(s) caused by external force.

The structure according to the first embodiment allows a high voltage generator to be enhanced in reliability by reducing a possibility of dielectric breakdown, and reduced in size, and improved in productivity.

The circuit boards are arranged at sufficient intervals. This suppresses electric discharge between the circuit boards, especially between the capacitors. The intervals between the circuit boards after production thereof are maintained constant by the diodes and the connection terminals, and furthermore the lead wires of the diodes are not bent. This serves to reduce a possibility of insulation deterioration due to external force.

Figure 4:
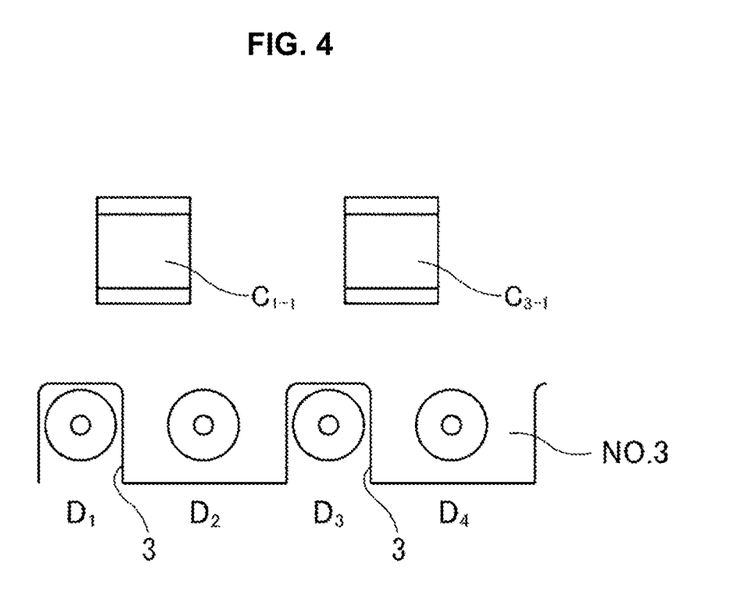
FIG. 4 is a diagram showing positioning of diodes according to the first embodiment.

FIG. 4 shows how to position the diodes, where a part of circuit board No. 3 is shown as an example. Positioning of diodes $D_1$ and $D_3$ is facilitated by indentations 3. Positioning of diodes $D_2$, $D_4$, $D_5$, and $D_6$ can be similarly performed although omitted in the drawing. This reduces production man-hours, and improves productivity. Furthermore, indentations 3 also secure sufficient distances between the diodes, and thereby serve to ensure insulation therebetween and enhance reliability.

The capacitors C mounted on surfaces of circuit boards No. 1 to No. 4 are flat and short. This eliminates limitation in interval between the circuit boards caused by dimensions of the capacitors, and serves to downsize the device in comparison with a case of employing cylindrical capacitors.

Jig 4 for positioning of the circuit boards fixes circuit boards No. 1 to No. 4 as shown in FIG. 3. This serves to facilitate assembly operation and thereby further improve productivity.

The first embodiment is suitable for a high voltage generator with a small capacity.

FIGS. 1 to 3 exemplify configurations in a case of employing the four circuit boards. As long as circuit boards are three or more in number, the present invention is applicable because of existence of the middle part circuit board(s) (i.e., the circuit board(s) other than ones at both ends) fixing diodes with indentations.

Second Embodiment

Figure 5:
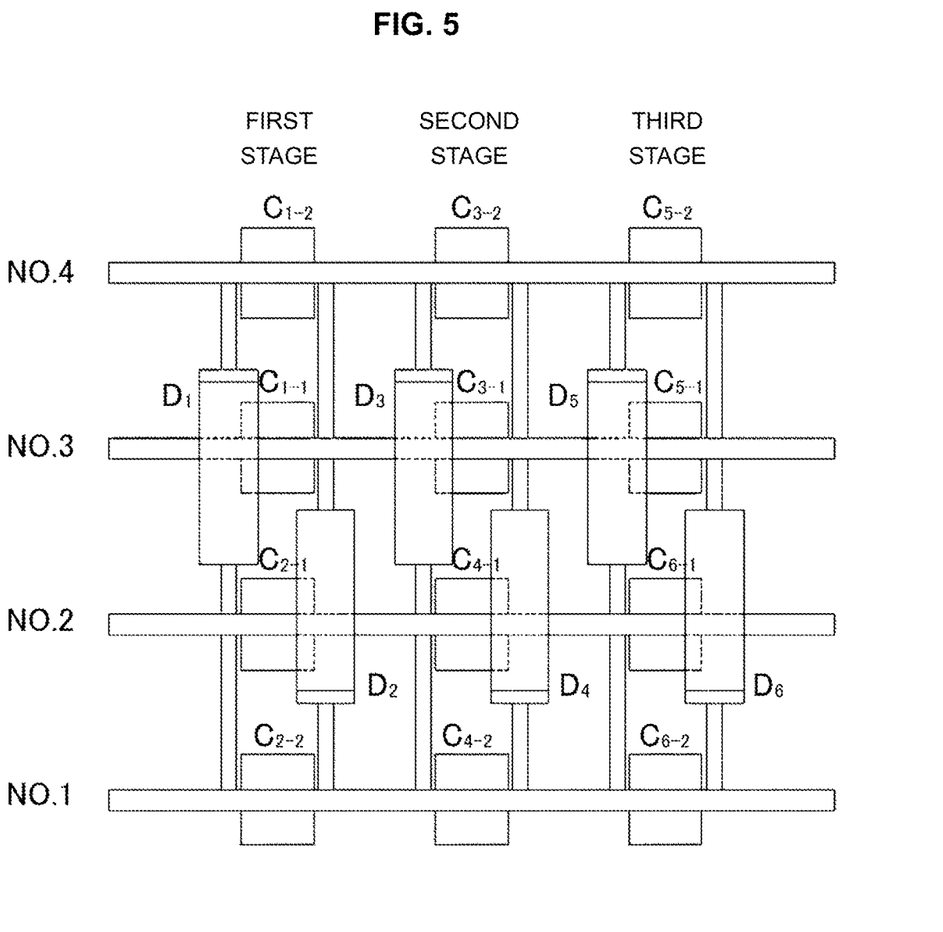
FIG. 5 is a front view of a high voltage generator according to a second embodiment.

FIG. 5 shows a structure of a high voltage generator according to the second embodiment. Capacitors C are added on back surfaces of the circuit boards in order to increase capacitances of the capacitors. The capacitors C on the back surfaces of the circuit boards and the capacitors C on the front surfaces of the circuit boards are connected in parallel in the circuit boards.

The structure according to the second embodiment serves to double the capacitances of the capacitors, while obtaining the effects similar to the first embodiment. The doubling of the capacitances enhances the CW circuit in output power.

Third Embodiment

Figure 6:
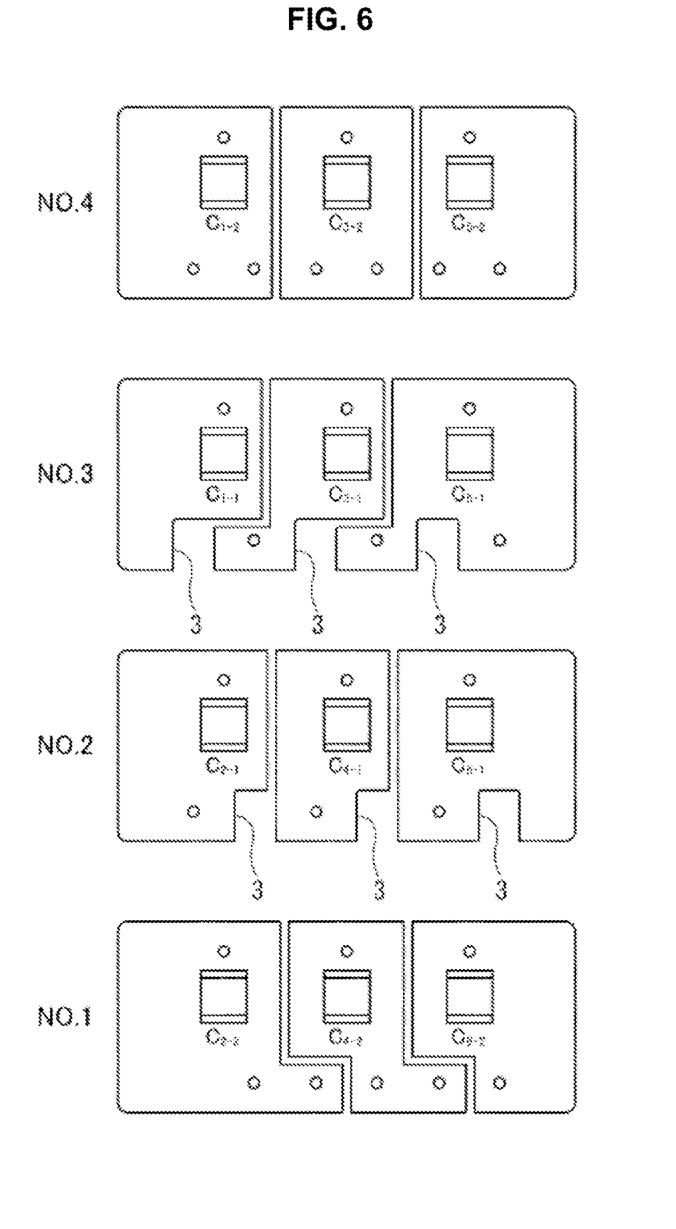
FIG. 6 is a diagram showing how to divide circuit boards according to a third embodiment.

FIG. 6 shows a structure of a high voltage generator according to the third embodiment. This is configured to divide the circuit boards of the first embodiment by each stage with slits. This dividing method shown in FIG. 6 is an example of obtaining effects by dividing parts that may undergo creeping discharge.

The structure according to the third embodiment serves to divide parts having potential differences on the circuit boards, while obtaining the effects similar to the first and second embodiments. This suppresses occurrence of creeping discharge on the circuit boards which is a major problem upon mounting a high voltage generator circuit to the circuit boards.

Jig 4 for positioning of the circuit boards serves to maintain constant the intervals between the circuit boards and the distances between the stages of the circuit boards. Accordingly, jig 4 facilitates production of the structure that suppresses the divided circuit boards from contacting with each other.

Thus, the structure according to the third embodiment serves to suppress creeping discharge from being caused on the circuit boards, and thereby further enhance reliability.

Fourth Embodiment

Each of the first to third embodiments is beneficial to downsizing, but has a problem in maintaining quality of mounting operation because of difficulty in machine processing and necessity for manual soldering.

Figure 7:
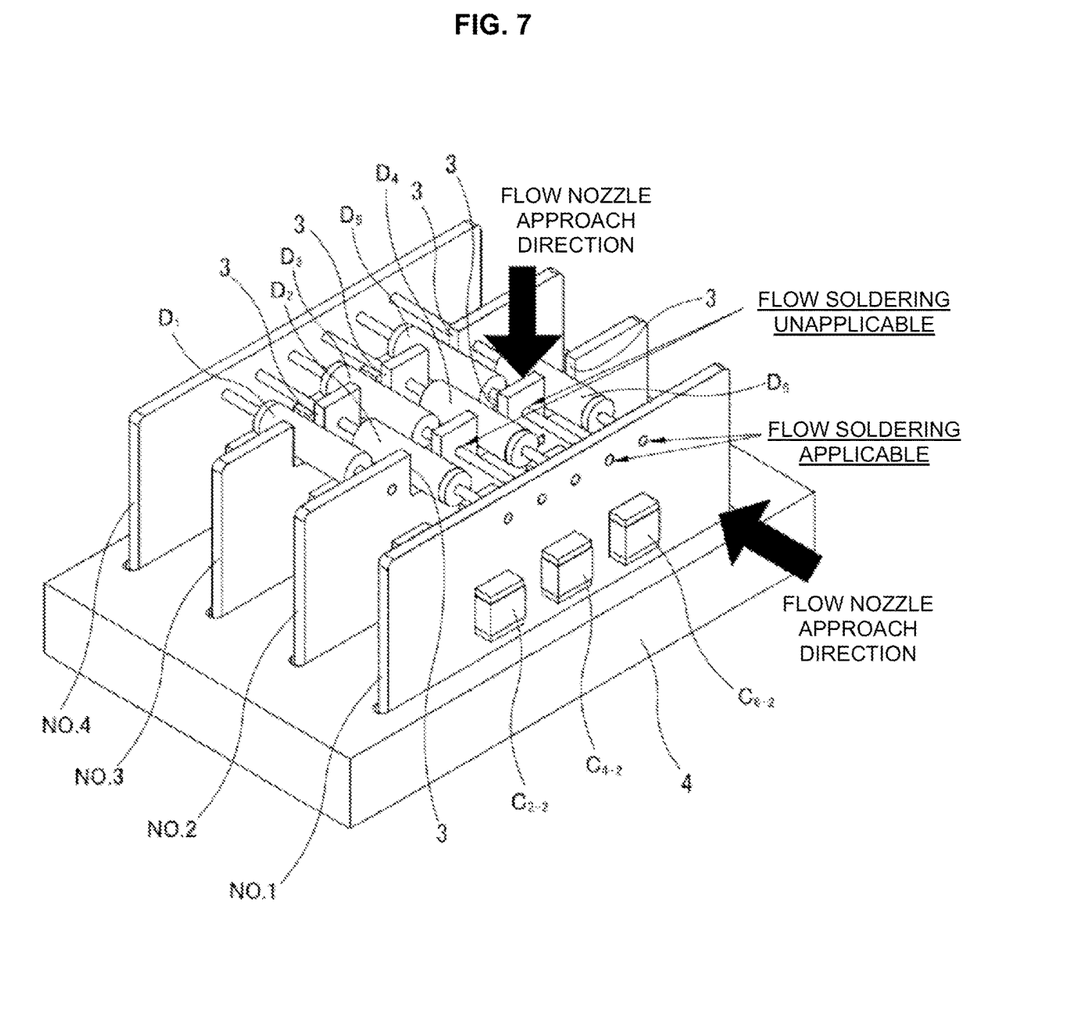
FIG. 7 is a diagram showing flow-nozzle approach directions in the first to third embodiments.

The reason why the machine processing is difficult for the first to third embodiments is that the structures thereof do not allow a nozzle for flow soldering to enter all of soldering points of Through hole Mount Devices (TMDs) upon assembling the four circuit boards into a unit. As shown in FIG. 7, each of the first to third embodiments allows a nozzle for flow soldering to approach soldering points in the outside two circuit boards No. 1 and No. 4, but does not allow the nozzle to approach soldering points in the central two circuit boards No. 2 and No. 3.

Accordingly, the structures of the first to third embodiments require manual soldering or use of a special and expensive apparatus.

Figure 8:
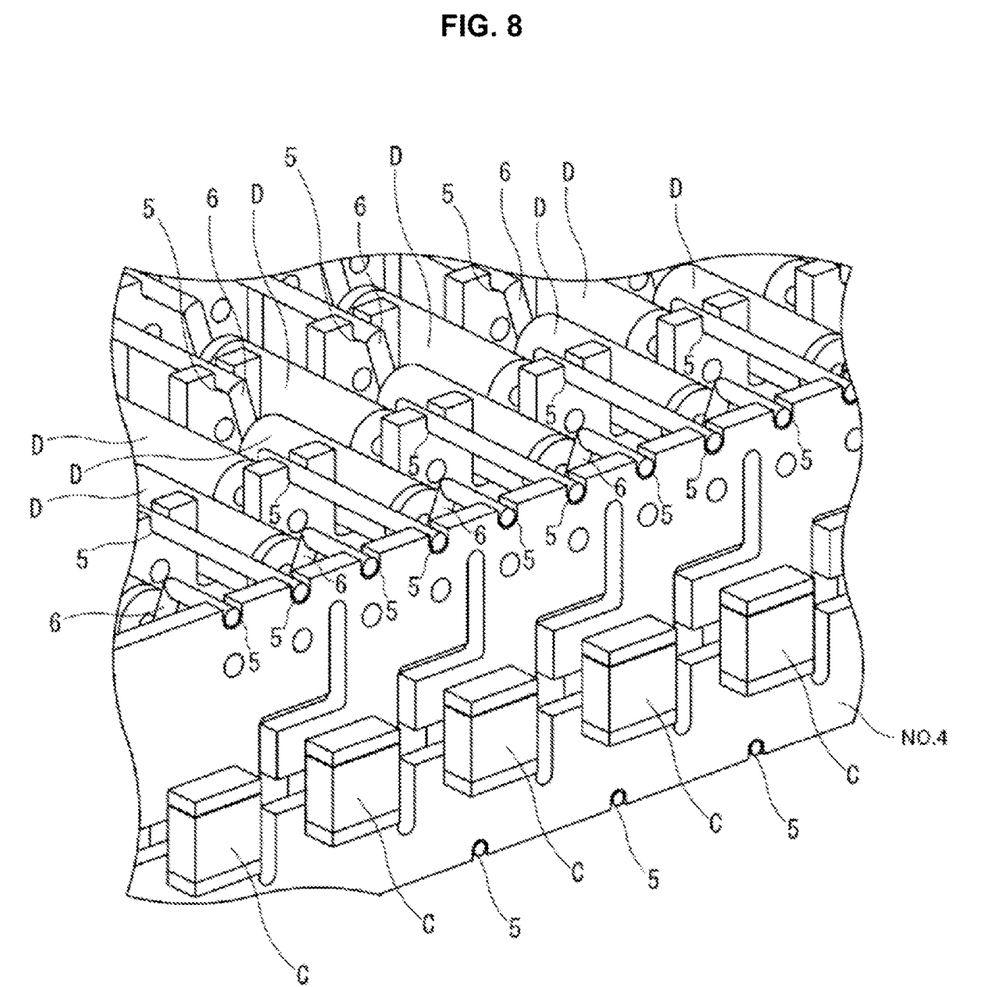
FIG. 8 is a perspective view of a high voltage generator according to a fourth embodiment.
Figure 9:
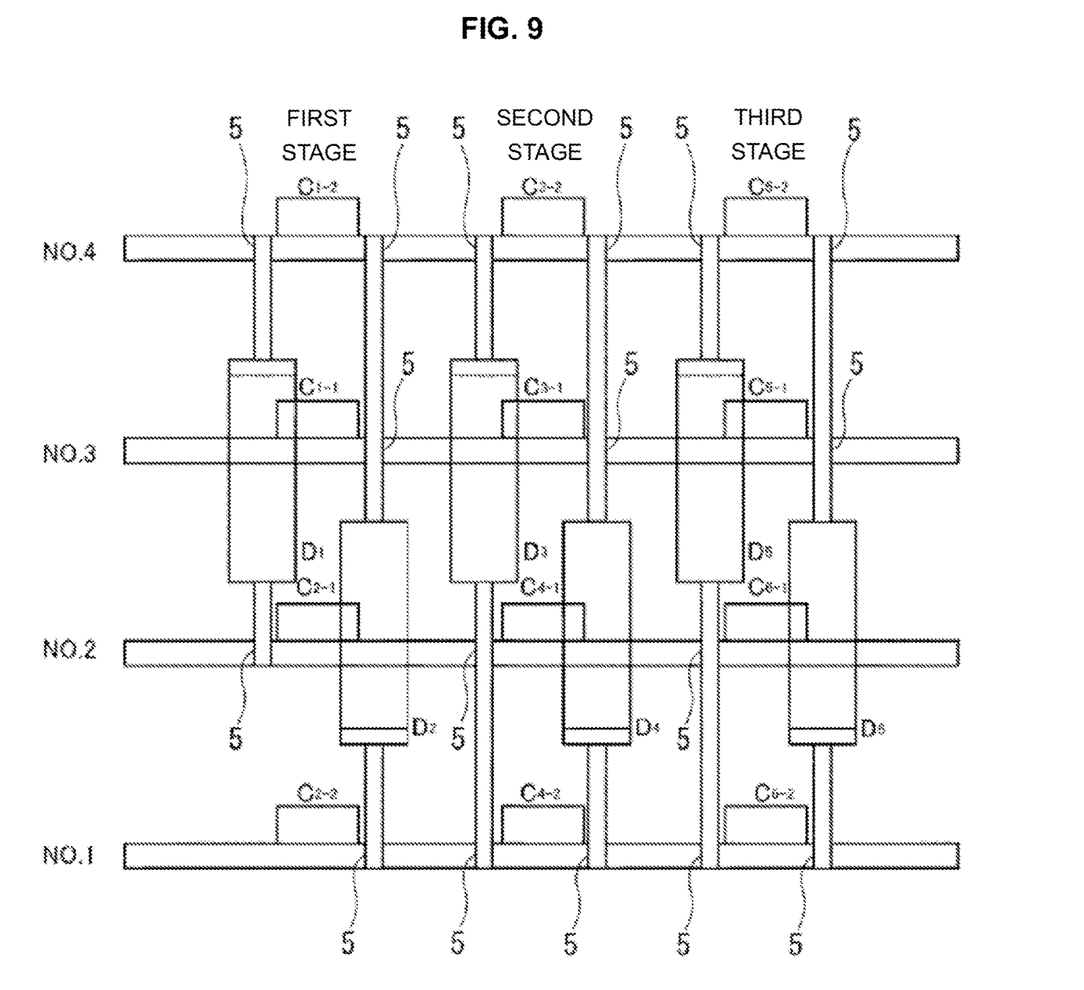
FIG. 9 is a front view of the high voltage generator according to the fourth embodiment.
Figure 10:
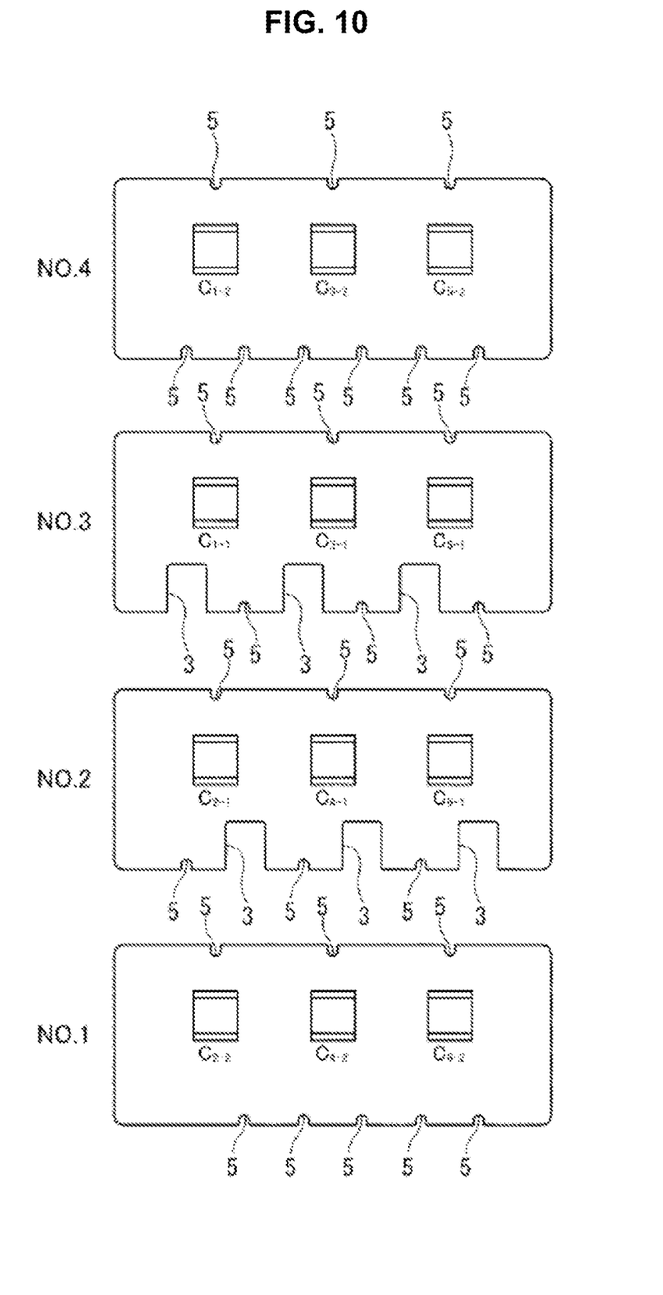
FIG. 10 is a top view of circuit boards of the high voltage generator according to the fourth embodiment.

The fourth embodiment is, as shown in FIGS. 8 to 10, configured to bend twice each of the lead wires (i.e., anode leads and cathode leads) of diodes $D_1$ to $D_6$, and connect the lead wires of diodes $D_1$ to $D_6$ to circuit boards No. 1 to No. 4 at end faces of circuit boards No. 1 to No. 4. This makes connection points between the lead wires of diodes $D_1$ to $D_6$ and circuit boards No. 1 to No. 4 serve as end face through holes. Each of diodes $D_1$ to $D_6$ is formed to include the anode lead and the cathode lead. In FIGS. 8 to 10, reference numerals 5 represent the end face through holes, and reference numerals 6 represent twice-bent portions. In addition, bodies of diodes $D_1$ to $D_6$ are disposed in indentations 3 similarly to the first to third embodiments.

While the first to third embodiments have difficulty in machine processing of the diodes to circuit boards No. 2 and No. 3, the fourth embodiment employs the end face through holes suitable for machine processing such as spot soldering, and thereby serves to considerably reduce failure in soldering. The reason why the end face through holes are suitable for machine processing is that employment of the end face through holes causes mounting points to move from insides of the circuit boards to ends of the circuit boards, and allows a nozzle for flow soldering to approach the mounting points.

While the first to third embodiments require diodes $D_1$ to $D_6$ to be disposed to pierce the through holes of the circuit boards, the fourth embodiment allows diodes $D_1$ to $D_6$ to be disposed by simply placing them from a side of circuit boards No. 1 to No. 4.

As described above, the structure of the fourth embodiment serves to produce a high voltage generator being small-sized, suitable for machine processing, and easy to manufacture, and thereby further enhance reliability.

The fourth embodiment is configured to bend twice the anode leads and the cathode leads of diodes $D_1$ to $D_6$ and employ the end face through holes, and thereby allows all of soldering points to be processed by machine. Furthermore, the fourth embodiment eliminates a component to be disposed to pierce through holes upon mounting to the circuit boards, and thereby facilitates mounting of components.

The above details only the specific embodiments of the present invention. As being obvious for a person skilled in the art, the present invention may be variously changed or modified within scope of technical ideas of the present invention, and also such changes and modifications belong to scope of the present invention.

The invention claimed is:

1. A high voltage generator including a Cockcroft-Walton circuit structured to receive alternating-current power supplied from an alternating-current power source and apply a potential difference to a load, the high voltage generator comprising:
   three or more circuit boards arranged at intervals in a thickness direction thereof;
   capacitors, each of which is shaped flat and mounted to a corresponding one of the circuit boards; and
   diodes, each of which is connected to corresponding ones of the circuit boards,
   wherein:
   out of the three or more circuit boards, each circuit board other than two circuit boards disposed at both ends of the arrangement of the three or more circuit boards includes indentations; and
   each of the diodes is disposed in a corresponding one of the indentations.

2. The high voltage generator as claimed in claim 1, wherein each of the diodes includes a lead wire extending straight.

3. The high voltage generator as claimed in claim 1, wherein each of the diodes includes a wire bent twice, and connected to a corresponding one of the circuit boards at an end face of the corresponding one of the circuit boards.

4. The high voltage generator as claimed in claim 1, wherein the capacitors include a pair of the capacitors respectively mounted to a front face and a back face of a corresponding one of the circuit boards, and connected to each other in parallel.

5. The high voltage generator as claimed in claim 1, wherein each of the circuit boards is divided by a slit.

6. The high voltage generator as claimed in claim 1, wherein the circuit boards are fixed with a jig for positioning of the circuit boards, upon assembly of the circuit boards.

7. An X-ray generator comprising:
the high voltage generator as claimed in claim 1.

* * * * *